(12) United States Patent
Col et al.

(10) Patent No.: US 6,647,489 B1
(45) Date of Patent: *Nov. 11, 2003

(54) COMPARE BRANCH INSTRUCTION PAIRING WITHIN A SINGLE INTEGER PIPELINE

(75) Inventors: Gerard M. Col, Austin, TX (US); G. Glenn Henry, Austin, TX (US); Rodney E. Hooker, Austin, TX (US)

(73) Assignee: IP-First, LLC, Fremont, CA (US)

( * ) Notice: Subject to any disclaimer, the term of this patent is extended or adjusted under 35 U.S.C. 154(b) by 597 days.

This patent is subject to a terminal disclaimer.

(21) Appl. No.: 09/590,055

(22) Filed: Jun. 8, 2000

(51) Int. Cl.[7] .................................................. G06F 9/30
(52) U.S. Cl. ...................................... 712/226; 712/234
(58) Field of Search ................................ 712/226, 234, 712/211

(56) References Cited

U.S. PATENT DOCUMENTS

| | | | | |
|---|---|---|---|---|
| 5,502,826 A | * | 3/1996 | Vassiliadis et al. | 712/213 |
| 5,539,888 A | * | 7/1996 | Byers et al. | 712/234 |
| 6,175,370 B1 | * | 1/2001 | Kunimatsu | 345/621 |
| 6,324,643 B1 | * | 11/2001 | Krishnan et al. | 712/237 |
| 6,330,657 B1 | * | 12/2001 | Col et al. | 712/23 |
| 6,338,136 B1 | * | 1/2002 | Col et al. | 712/221 |

* cited by examiner

*Primary Examiner*—William M. Treat
(74) *Attorney, Agent, or Firm*—Richard K. Huffman; James W. Huffman

(57) ABSTRACT

An apparatus and method are provided for executing a combined compare-and-branch operation in a single integer pipeline microprocessor. Typically, the compare-and-branch operation is specified by two macro instructions. The first macro instruction, a compare macro instruction, directs the microprocessor to compare two operands, resulting in the update of a flags register to describe various attributes of the comparison result. The second macro instruction, a conditional jump macro instruction, directs the microprocessor to examine the flags register and to branch program control to a target address if a prescribed condition is met. The apparatus has translation logic that combines the compare macro instruction and the conditional jump macro instruction into a single compare-and-branch micro instruction. The single compare-and-branch micro instruction directs the microprocessor to make the comparison and to perform a conditional branch based upon a result of the comparison. The apparatus also has execute logic that is coupled to the translation logic. The execute logic makes the comparison and generates the result. Jump resolution logic in a stage following the execute logic accesses the flags register to resolve the conditional jump operation.

29 Claims, 7 Drawing Sheets

FIG. 2 (Related Art)

Compare-and-Branch Operation

| Cycle | Translate | Register | Address | Load | Align | Execute | Store | Write Back |
|---|---|---|---|---|---|---|---|---|
| 1 | CMP A,B | *** | *** | *** | *** | *** | *** | *** |
| 2 | Jc R | SUB T,A,B | *** | *** | *** | *** | *** | *** |
| 3 | PRED MAC | Jc R | SUB T,A,B | *** | *** | *** | *** | *** |
| 4 | *** | PRED MIC | Jc R | SUB T,A,B | *** | *** | *** | *** |
| 5 | *** | *** | PRED MIC | Jc R | SUB T,A,B | *** | *** | *** |
| 6 | *** | *** | *** | PRED MIC | Jc R | SUB T,A,B | *** | *** |
| 7 | *** | *** | *** | *** | PRED MIC | Jc R | SUB T,A,B | *** |
| 8 | *** | *** | *** | *** | *** | PRED MIC | Jc R | SUB T,A,B |
| 9 | *** | *** | *** | *** | *** | *** | PRED MIC | Jc R |

2 CYCLES

Logic for Executing Combined Compare/Jump Operation

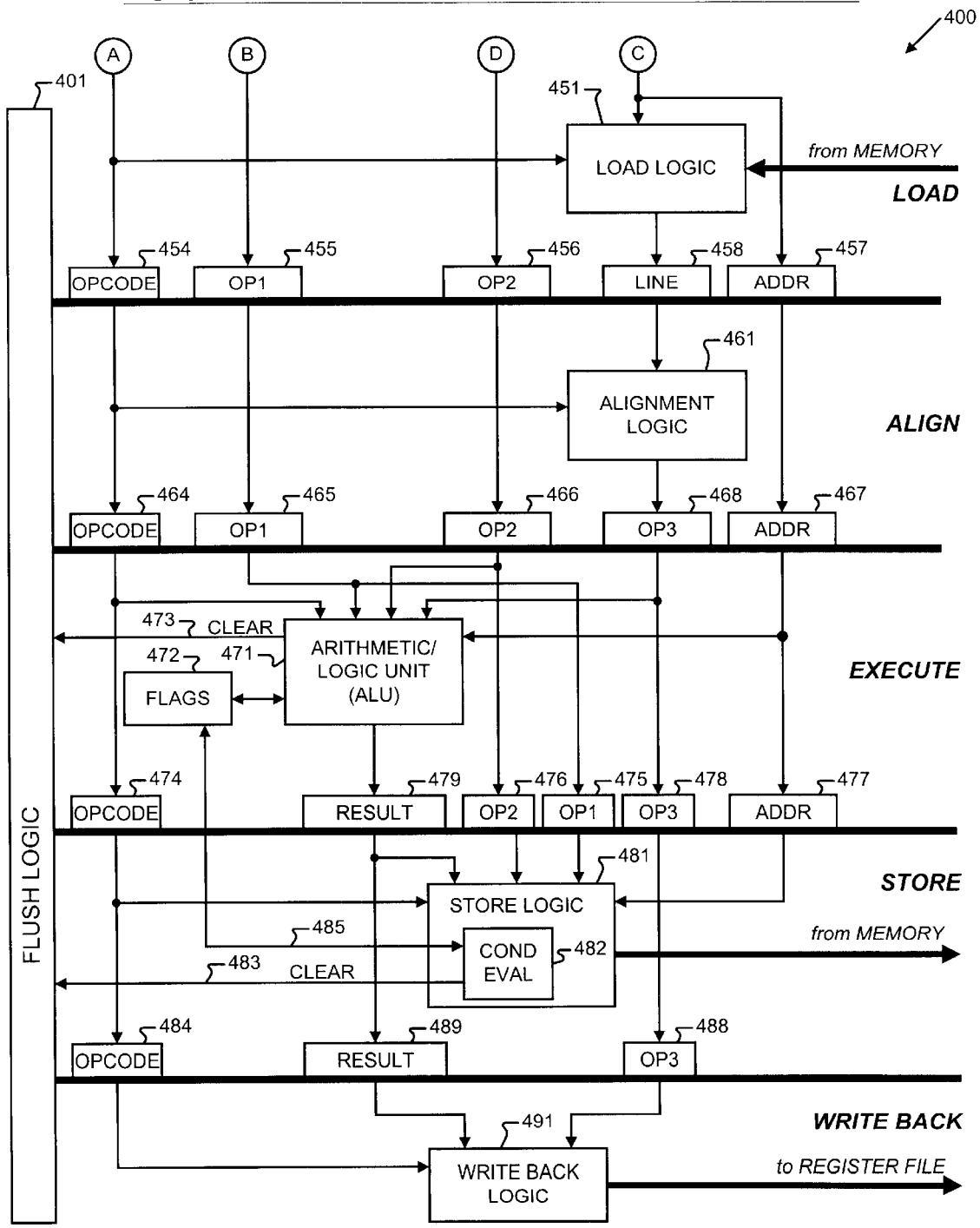
FIG. 4 (Con't.)
Logic for Executing Combined Compare/Jump Operation (Con't.)

FIG. 5

*Single-Cycle Compare-and-Branch Operation* — 500

| Cycle | Translate | Register | Address | Load | Align | Execute | Store | Write Back |
|---|---|---|---|---|---|---|---|---|
| 1 | CMP A,B | *** | *** | *** | *** | *** | *** | *** |
| 1 | Jc R | SUB.Jc T,A,B,R | *** | *** | *** | *** | *** | *** |
| 2 | PRED MAC | PRED MIC | SUB.Jc T,A,B,R | *** | *** | *** | *** | *** |
| 3 | *** | *** | PRED MIC | SUB.Jc T,A,B,R | *** | *** | *** | *** |
| 4 | *** | *** | *** | PRED MIC | SUB.Jc T,A,B,R | *** | *** | *** |
| 5 | *** | *** | *** | *** | PRED MIC | SUB.Jc T,A,B,R | *** | *** |
| 6 | *** | *** | *** | *** | *** | PRED MIC | SUB.Jc T,A,B,R | *** |
| 7 | *** | *** | *** | *** | *** | *** | PRED MIC | SUB.Jc T,A,B,R |
| 8 | *** | *** | *** | *** | *** | *** | *** | *** |

|← 1 CYCLE →|

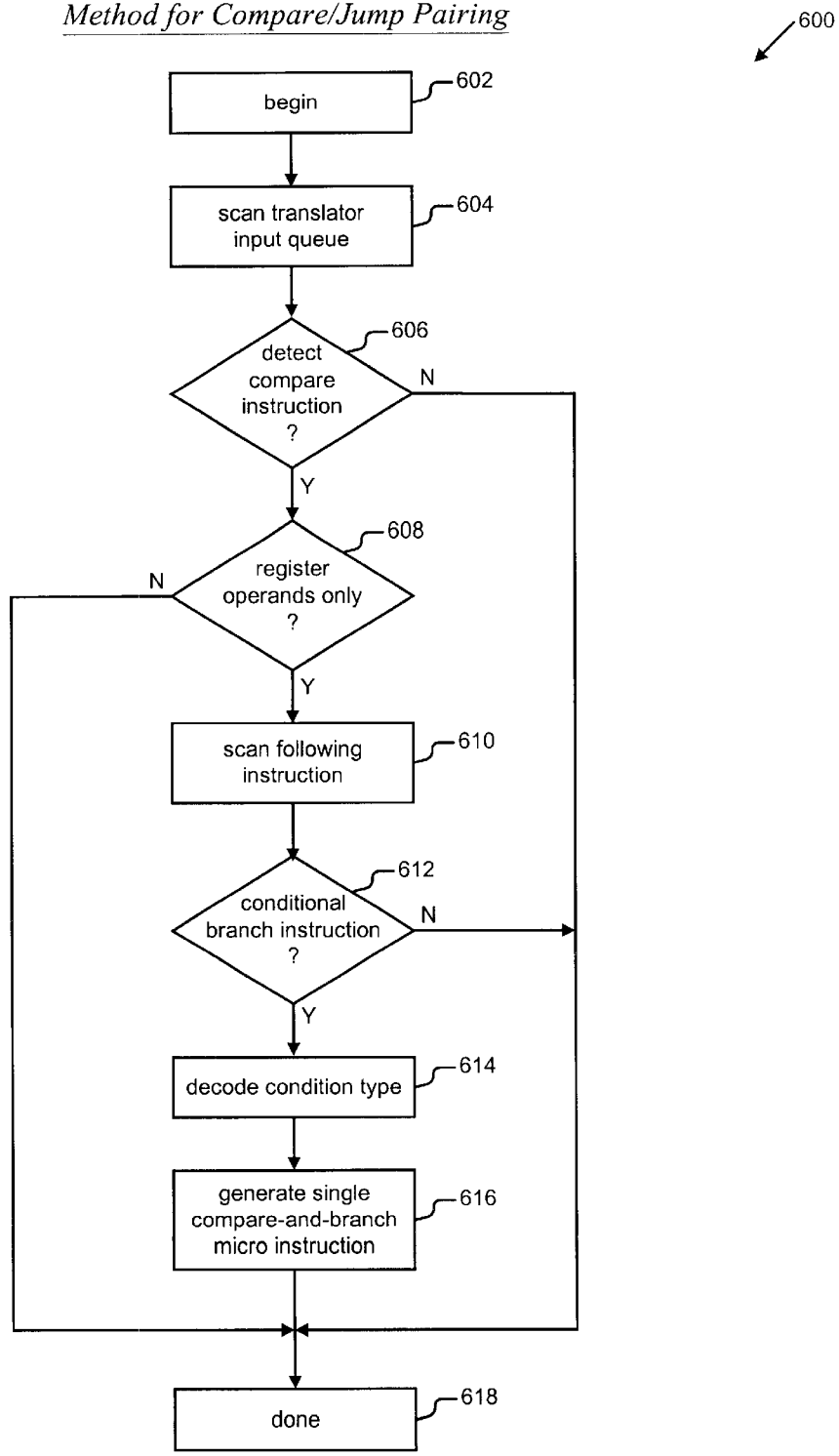

COMPARE BRANCH INSTRUCTION PAIRING WITHIN A SINGLE INTEGER PIPELINE

BACKGROUND OF THE INVENTION

1. Field of the Invention

This invention relates in general to the field of instruction execution in computers, and more particularly to an apparatus and method for executing a paired compare-and-branch operation within a single integer pipeline.

2. Description of the Related Art

Conditional jump instructions are common to all present day microprocessor instruction sets. A conditional jump instruction allows a programmer to direct a microprocessor to evaluate the state of the microprocessor or particular attributes of a previously generated result at a certain point in an application program. Programmers employ conditional jump instructions to redirect the flow of an application program based upon the findings of the evaluation. Most often, a conditional jump instruction specifies that the contents of a result status register, or flags register, are to be evaluated against a prescribed criteria. The flags register contains bits, or flags, that are set when a result is generated by the microprocessor. The flags are set to indicate the condition of the result. For example, an instruction directing the microprocessor to add two operands is executed by generate a result. Accordingly, the flags register is updated to reflect attributes of the generated sum. For example, if the sum is zero, then a zero flag in the flags register is set. If the sum is a negative number, then a sign flag is set to indicate that the sum is negative. Consequently, the conditional jump instruction provides a programmer with the flexibility to make program control decisions based upon certain attributes, or conditions, of a generated result without having to specifically examine the result itself. The programmer may desire to direct program control to another location if the result is zero, in which case he/she would program a conditional jump instruction immediately following the instruction that generates the result where the conditional jump instruction prescribes a jump, or branch, to a target address if the zero flag in the flags register is set.

In many cases, a conditional jump decision is not made based upon an explicitly generated result, but rather upon a comparison of two operands. For example, a conditional jump decision can be made based upon whether a first operand is equal to a second operand. In this example, the only knowledge of the two operands that is required to make the jump decision is whether they are equal; no "result" is necessarily required. For situations such as this, microprocessor instruction sets provide a compare instruction. The compare instruction enables a programmer to specify two operands to be compared and, upon execution of the compare instruction, the outcome of the comparison is reflected by updating to the flags register. To accomplish the comparison, some microprocessors subtract the first operand from the second operand; other microprocessors utilize a different comparison technique altogether to derive attributes that distinguish the two operands. Regardless of what approach is used to make the comparison, it is the bits within the flags register that describe the comparison result.

Compare instructions rarely occur in isolation in an application program. This is because operands are typically compared in order to make some type of decision based upon the result of their comparison. Hence, instead of finding a stand-alone compare instruction in an application program, it is much more common to find a compare instruction that is immediately followed by a conditional jump instruction. In fact, this combination of macro instructions is so commonly encountered that the operation prescribed by these two instructions in combination together is referred to as a compare-and-branch operation or compare/branch operation.

A present day microprocessor is divided into stages, with each stage dedicated to performing a specific function. A first stage fetches program instructions from memory and places them in a macro instruction queue. A following stage decodes these macro instructions into associated micro instructions. Decoded micro instructions are then executed in sequence by subsequent stages of the microprocessor in synchronization with a microprocessor clock signal. This decoding, or translation, of macro instructions into micro instructions is required primarily to permit legacy application programs to execute on newer microprocessors. In fact, the x86 instruction set architecture still maintains the same macro instructions today as were initially provided during the late 1970's.

The format and syntax of macro instructions provide for structured and standardized software engineering practices, thus fostering the production of application programs that can be executed on a number of different microprocessors. In contrast, micro instructions are deliberately designed to operate such that the capabilities of a specific microprocessor are exploited and its limitations are circumvented. Accordingly, a micro instruction will never prescribe a task that logic within a given stage of the microprocessor cannot perform. In reality, one most often finds that a single macro instruction must be translated into several micro instructions, each of the micro instructions directing the microprocessor to perform a certain task, the aggregate of which accomplish the operation prescribed by the single macro instruction.

Because of this complexity surrounding the translation of macro instructions into corresponding micro instructions, a present day pipeline microprocessor typically does not attempt to combine two or more macro instructions into a single micro instruction. Hence, what transpires when a programmed compare-and-branch operation is encountered is that two micro instructions are generated: a first compare micro instruction corresponding to the compare macro instruction and a second conditional jump micro instruction corresponding to the conditional jump macro instruction.

What's more, the continued proliferation of microprocessors into the marketplace has only served to significantly expand the requirements for faster and more efficient performance. And certainly, there are microprocessors, such as Intel's Pentium® III, that provide multiple execution pipelines that are capable of executing macro instructions in parallel. But these microprocessors are very costly to manufacture and result in a design that is much more complex than the traditional single execution pipeline.

Within a single pipeline microprocessor, combination of the compare operation with the jump operation has not been heretofore achievable because both operations require the same logic resources to update and to access the flags register. Consequently, the two tasks must be performed in sequence by two separate micro instructions because logic within only one pipeline stage is dedicated to reading and writing the flags register.

The present inventors have, however, observed that a most micro instruction formats can accommodate a single micro instruction that can prescribe both the compare task and the conditional jump task for compare/branch operations when the compare task prescribes register operands only. What is currently lacking is the logic for pairing the two macro instructions within early pipeline stages and the apparatus in later pipeline stages that permits one stage to update the flags register with the result of the comparison and logic in a following stage that is capable of reading the flags register to resolve the conditional jump.

Therefore, what is needed is a single pipeline microprocessor for executing a compare-and-branch operation by employing a single compare/branch micro instruction.

In addition, what is needed is an apparatus in a single pipeline microprocessor that is capable of executing a compare/jump operation much faster than has heretofore been provided.

SUMMARY

It is a feature of the present invention to provide a microprocessor, having a single integer pipeline, for performing a compare-and-branch operation. The microprocessor includes translation logic and execute logic. The translation logic receives a compare macro instruction and a conditional jump macro instruction, and generates a compare-and-branch micro instruction directing the microprocessor to make a comparison and to perform a conditional branch based upon a result of the comparison. The execute logic is coupled to the translation logic. The execute logic makes the comparison and generates the result.

In another aspect, it is a feature of the present invention to provide an apparatus in a single pipeline microprocessor for executing a compare-and-branch operation. The apparatus has a jump combiner, compare execution logic, and jump resolution logic. The jump combiner pairs a compare instruction and a conditional jump instruction into a compare/branch micro instruction. The compare/branch micro instruction prescribes a comparison task and a conditional branch task. The compare execution logic is coupled to the jump combiner. The compare execution logic receives the compare/branch micro instruction, it performs the comparison task, it generates a result of the comparison task, and it updates bits in a flags register to describe the result. The jump resolution logic is coupled to the compare execution logic. The jump resolution logic evaluates one or more of the bits to resolve the conditional branch task.

In a further aspect, it is a feature of the present invention to provide an apparatus for executing a macro instruction sequence that directs a microprocessor to compare two register operands, to update a flags register to describe a comparison result, to evaluate the flags register to determine if the comparison result satisfies a prescribed condition, and to transfer program control to a branch target address if the prescribed condition is satisfied. The apparatus includes translation logic and condition evaluation logic. The translation logic decodes the macro instruction sequence into a compare-and-branch micro instruction. The compare-and-branch micro instruction has two operand fields, an opcode field, and an immediate field. The two operand fields specify the two register operands. The opcode field specifies the prescribed condition and directs execute logic to compare the two register operands to generate the comparison result. The immediate field specifies the branch target address. The condition evaluation logic is coupled to the translation logic and evaluates the flags register.

In yet another aspect, it is a feature of the present invention to provide a method for performing a compare-and-branch operation in a pipeline microprocessor. The method includes translating a compare macro instruction and a conditional jump macro instruction into a single compare-and-jump micro instruction, performing a compare operation prescribed by the single compare-and-jump micro instruction to produce a result, and evaluating the result in accordance with a condition prescribed by the single compare-and-jump micro instruction to indicate whether or not a branch is to be taken.

BRIEF DESCRIPTION OF THE DRAWINGS

These and other objects, features, and advantages of the present invention will become better understood with regard to the following description, and accompanying drawings where:

FIG. 2 is a table illustrating execution of a compare macro instruction and a conditional jump macro instruction by the microprocessor of FIG. 1.

FIG. 5 is a table illustrating paired execution of a compare macro instruction and a conditional jump macro instruction by the microprocessor of FIG. 4.

FIG. 6 is a flow chart of a method according to the present invention for generating a single micro instruction to perform a compare-and-jump operation.

DETAILED DESCRIPTION

In light of the above background on techniques for performing a compare-and-jump operation, related art examples will now be discussed with reference to FIGS. 1 and 2. These examples illustrate how present day pipeline microprocessors do not efficiently execute this type of operation. In particular, the examples point out that execution of a compare-and-jump results in the generation of two associated micro instructions, essentially because the architecture of present day microprocessors precludes a single micro instruction from directing the tasks required to accomplish a compare-and-branch operation. Following this discussion, a detailed description of the present invention will be provided with reference to FIGS. 3 through 6. The present invention provides an apparatus and method for the generation of a single micro instruction that directs both a compare task and a jump task, along with commensurate apparatus to effectively execute these tasks, thus allowing a compare-and-jump operation to execute much faster than has heretofore been provided within a single pipeline microprocessor.

Figure 1:
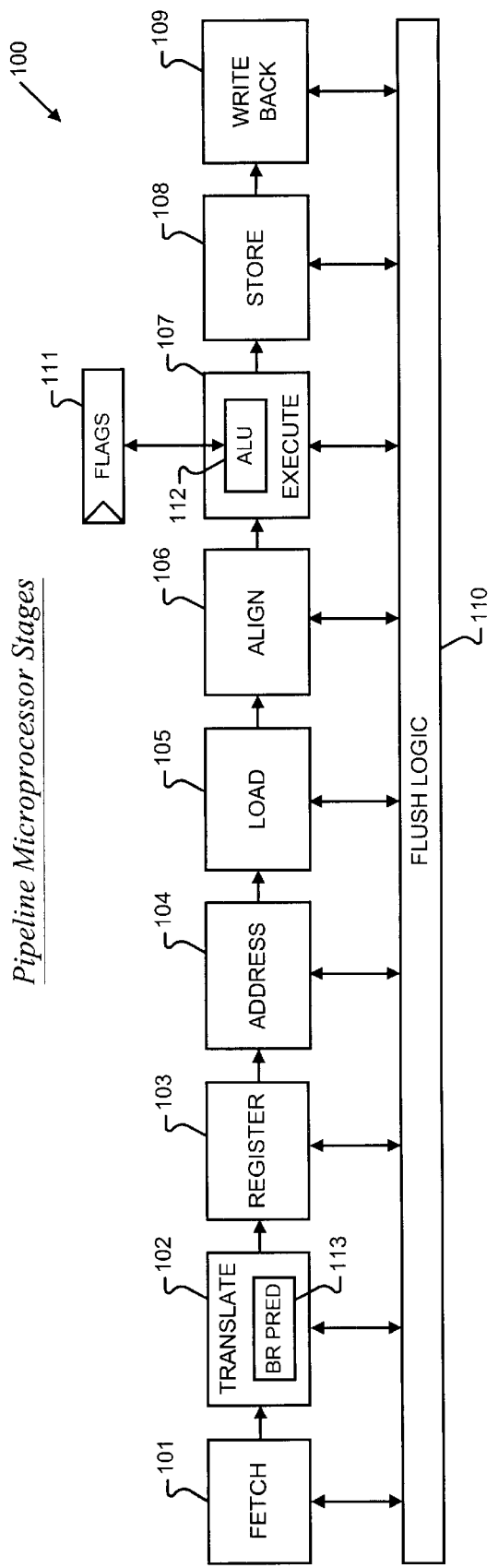
FIG. 1 is a block diagram illustrating stages of a related art pipeline microprocessor.

Referring to FIG. 1, a block diagram is presented illustrating stages of a related art pipeline microprocessor 100. The microprocessor 100 includes a fetch stage 101, translate stage 102, register stage 103, address stage 104, load stage 105, align stage 106, execute stage 107, store stage 108, and write back stage 109. Branch prediction logic 113 is included in the translate stage 102 and the execute stage 107 has an arithmetic logic unit (ALU) 112. The ALU 112 accesses a flags register 111. The microprocessor 100 also includes pipeline flush logic 110 that is connected to each of the pipeline stages 101–109.

Operationally, the fetch stage 101 retrieves macro instructions from external memory (not shown) that are to be executed by the microprocessor 100. The translate stage 102 translates, or decodes, the fetched macro instructions into associated micro instructions. The register stage 103 retrieves operands specified by the micro instructions from a register file (not shown) for use within subsequent stages 104–109 of the pipeline. The address stage 104 generates memory addresses specified by the micro instructions to be used in data storage operations, data retrieval operations, or program control transfer operations. The load stage 105 reads data from the external memory using the addresses generated in the address stage 104. The align stage 106 extracts memory operands from the retrieved data and aligns the memory operands for execution. The ALU 112 within the execute stage 107 performs arithmetic, logical, or other prescribed operations to generate results using the operands retrieved from the register file and/or memory. The ALU 112 also updates the flags register 111 to describe particular attributes of the results. In addition, when the execute stage 107 executes certain program control transfer instructions, the ALU 112 reads the flags register 111 to evaluate the attributes corresponding to a most recently generated result. The store stage 108 writes the results generated by the execute stage 107 or the operands retrieved from the register file to external memory at the memory addresses calculated by the address stage 104. The write back stage 109 updates registers in the register file with the results generated in the execute stage 107 or with operands retrieved from memory by the load stage 105.

Micro instructions proceed in sequence through each successive stage of the pipeline in synchronization with a pipeline clock signal (not shown). To achieve optimum pipeline performance, while a given micro instruction is executing in a given stage of the pipeline, a preceding micro instruction should be executing in a subsequent pipeline stage and a following micro instruction should be executing in a previous pipeline stage. In other words, during any given clock cycle, all stages 101–109 of the microprocessor 100 should be performing their architected functions; no stage should sit idle.

Software application programs are predominantly sequential in nature because the operations directed by these application programs typically are performed in sequential steps. Hence, to maximize instruction throughput, microprocessor designers tailor the design of a present day microprocessor 100 so that it will rapidly execute sequential program instructions. Sequential program instructions are program instructions that are stored in sequential memory locations. The sequential nature of software notwithstanding, there are certain points within application programs where a programmer desires to direct the microprocessor 100 to transfer program control to some instruction other than a next sequential instruction. The transfer of program control to a non-sequential instruction is referred to as a branch, or jump, within the program. And the macro instructions that direct the microprocessor 100 to perform a jump are called program control transfer instructions, jump instructions, or branch instructions. The address of the non-sequential instruction to which program control is transferred is referred to as a jump target, a branch target address, or a target address.

Some program control transfer instructions direct the microprocessor 100 to unconditionally branch to a new non-sequential instruction. In the x86 instruction set, examples of such unconditional branch instructions include JMP, CALL, and RET. Other program control transfer instructions direct the microprocessor 100 to conditionally branch to a target address, where the decision to branch or not is based upon an evaluation of some prescribed criteria or condition. Hence, when a conditional jump instruction is executed, the criteria must first be evaluated. If the evaluation indicates that the prescribed criteria has been satisfied, then the microprocessor 100 takes the branch to the target address. If the evaluation indicates that the prescribed criteria has not been satisfied, then sequential program flow continues; the microprocessor 100 does not take the branch. Conditional branch instructions, such as Jcc in the x86 instruction set, provide application programs the powerful capability to make decisions based upon inputs to the programs.

A present day microprocessor 100 rapidly and effectively executes sequential program instructions because virtually all instruction sequences within application programs are sequential. Hence, the fetch stage 101 is designed to generate a next sequential instruction address based upon the address of a currently executing instruction, thereby providing the stand-alone capability within the fetch stage 101 to fetch sequential instructions without depending upon inputs from other stages 102–109 of the microprocessor 100. But while the fetch stage 101 does have the capability to compute next sequential addresses, it cannot compute the addresses of branch target instructions. Consequently, when a jump instruction is encountered, the fetch stage 101 be provided with the target address at which to continue fetching instructions.

In a present day microprocessor 100, the generation of branch target addresses is performed by the branch prediction logic 113 within the translate stage 102. Branch prediction logic 113 enables the fetch stage 101 to keep the pipeline full of instructions, without otherwise having to stall the pipeline while waiting for a branch instruction to finish execution. When a jump instruction is provided to the translate stage 102 from the fetch stage 101, the branch prediction logic 113 generates a predicted outcome for the branch along with a predicted target address. Generation of the predicted target address, or speculative target address, is typically based upon historical execution properties and/or static statistical properties of the particular jump instruction that is being executed. The branch prediction logic 113 provides the predicted target address to the fetch stage 101 so that it can be used to fetch the instruction that is most likely to follow the jump instruction. Upon receipt of the branch target, the fetch stage 101 starts fetching instructions from the memory location provided by the branch prediction logic 113. Accordingly, pipeline stalls are minimized by predicting branch target addresses in the translate stage 102 because, for correctly predicted branch outcomes, not delay whatsoever is incurred.

But predicted branch outcomes and predicted target addresses are predictions at best. One never knows with complete certainty what the target of a branch will be—particularly the target of a conditional branch-until the corresponding branch instruction executes. For example, errors or exceptions may occur during the course of the branch instruction's execution that would nullify the branch. Or, memory parameters may have been modified since the last time the branch instruction was executed that would result in the generation of a different branch target address. Moreover, in the case of a conditional branch, the conditions upon which the branch decision are made may have changed since the last time the branch was executed. It is beyond the scope of this application to provide a comprehensive discussion of branch prediction techniques within pipeline microprocessors. However, it is sufficient herein to appreciate that the branch prediction logic 113 provides only a predicted target address for a jump instruction; the true target address is only known when the jump instruction executes. When the jump instruction executes, the branch is said to be "resolved" because a true outcome and a true target address have been determined with certainty.

The flush logic 110 handles jumps that are resolved in opposition to what has been predicted by the branch prediction logic 113. For example, if the branch prediction logic 113 predicts that a conditional jump instruction will "take" a branch to a non-sequential location, A, then the branch predictor 113 will provide A to the fetch logic 101, which will in turn begin fetching instructions from location A to follow the conditional jump instruction. But if the execute stage 107 resolves the conditional jump as "not taken," the then flush logic 110 must eliminate all the instructions in the pipeline that follow the conditional jump instruction because they correspond to an incorrect prediction. The pipeline must be refilled with instructions that correspond to the resolved branch outcome. This procedure is known as flushing the pipeline.

Conditional jump instructions are very closely coupled to the flags register 111 in most microprocessors 100 because the criteria, or conditions, upon which conditional branch instructions typically make decisions involve the attributes of a most recently computed result. For example, the x86 conditional jump instruction, Jcc, has the capability of branching based upon the states of one or more result status bits within an x86 FLAGS register. These status bits include a carry flag (CF), which is set if an arithmetic operation generates a carry or a borrow out of the most-significant bit of the result; a parity flag (PF), which is set if the least-significant byte of the result contains an even number of 1 bits; a zero flag (ZF), which is set if the result is zero; a sign flag (SF), which is set equal to the most significant bit of the result, the most significant bit being the sign bit of a signed integer; and an overflow flag (OF), which is set if an integer result is too large a positive number or too small a negative number to fit in a destination operand, thus indicating an overflow condition for two's compliment arithmetic. Using only these result status bits, an x86 conditional jump instruction can be employed to prescribe the following jump conditions: above (CF=0 and ZF=0), not above (CF=1 and ZF=1), above or equal (CF=0), not above or equal (CF=1), below (CF=1), not below (CF=0), below or equal (CF=1 and ZF=1), not below or equal (CF=0 and ZF=0), carry (CF=1), not carry (CF=0), equal (ZF=1), not equal (ZF=0, greater (ZF=0 and SF=0), not greater (ZF=1 or SF<>OF), greater or equal (SF=OF), not greater or equal (SF<>OF), less (SF<>OF), not less (SF=OF), less or equal (ZF=1 or SF<>OF), not less or equal (ZF=0 and SF=OF), overflow (OF=1), not overflow (OF=0), sign (SF=1), not sign (SF=0), zero (ZF=1), not zero (ZF=0), parity even (PF=1), and parity odd (PF=0).

A conditional jump decision is usually made based upon the state of result status bits in a flags register 111 that correspond to a most recently computed result. For example, an application program may require a jump to a branch target address if a first operand is equal to a second operand. One programming technique for allowing the proper result attributes to be reflected in the flags register 111 when a corresponding conditional jump instruction is executed is to subtract the second operand from the first operand and then prescribe that the corresponding conditional jump instruction evaluate the state of a zero flag in the flags register 111 immediately following generation of the difference result. And although the subtraction indeed sets up the proper state of the zero flag in the register 111, one skilled in the art will note that the conditional jump decision can be made without regard to the specific magnitude of the two operands. The criteria to be evaluated is whether or not the two operands are equal. The resulting computed difference is not required by foregoing instructions. All that is really required to make the decision is that the two operands be compared and the zero bit in the flags register tested.

Because many conditional jump decisions are made based upon the distinctions between two operands, most macro instruction sets provide a compare instruction that allows a programmer to prescribe two operands for comparison. In the x86 instruction set, the compare instruction is designated CMP. For example, CMP AX,25 directs an x86 microprocessor to compare the contents of register AX with an immediate operand, 25. This type of compare instruction is referred to as a register/immediate compare because one of the operands is contained within a register (i.e., register AX) in the register stage 103 and the other is provided via an immediate field of the instruction itself. CMP AX, [BX] directs an x86 microprocessor to compare the contents of register AX with an operand stored in memory, whose address is prescribed by the contents of register BX. This type of compare instruction is referred to as a register/memory compare because one of the operands is contained within a register in the register stage 103 and the other is provided from memory. CMP AX,BX is referred to as a register/register compare because both operands are contained within registers in the register stage 103.

In a great number of instances, a conditional jump instruction immediately follows a compare instruction in the execution order of an application program. And because the operations prescribed by the two instructions are so closely coupled, those skilled in the art refer to this combination as a compare-and-jump operation, or more concisely, a compare-and-jump. Execution of a compare-and-jump operation is more specifically discussed with reference to FIG. 2.

Referring to FIG. 2, a table 200 is presented illustrating execution of a compare-and-jump operation by the microprocessor 100 of FIG. 1. The compare-and-jump operation is prescribed by the first two macro instructions shown in the Translate column of the table 200: a compare macro instruction, designated as CMP A,B, and a conditional jump macro instruction, designated as Jc R. More specifically, the compare macro instruction directs the microprocessor 100 to compare the contents of registers A and B in the register stage 103 and to update the flags register 111 based upon the result of the comparison. The conditional jump macro instruction directs the microprocessor 100 to read the flags register 111 and, if a prescribed condition is true following the comparison, to branch to a target address prescribed by an immediate operand, R. For illustrative purposes, the prescribed condition is not explicitly designated in the table 200; the prescribed condition could be any combination of bit states within the flags register 111 like that described above with reference to an x86 conditional jump instruction. Also, for clarity purposes, a column corresponding to the fetch stage 101 of the microprocessor 100 is not shown. Execution of the instructions by the microprocessor 100 is described with reference to cycles of a pipeline clock. Non-relevant instructions before and after instructions of interest are designated by "* * * ".

During cycle 1, the compare macro instruction proceeds through the translate stage 102. Therein, it is decoded into a corresponding subtraction micro instruction, designated as SUB T,A,B. More specifically, a micro opcode field, SUB, directs register stage logic 102 to retrieve the contents of registers A and B and to pipe these two register operands down to the execute stage 107. The micro opcode also directs the ALU 112 to subtract the contents of register B from the contents of register A and to update the flags register 111 to reflect the subtraction result. In addition, the micro instruction directs that a temporary destination register, T, be used to hold the subtraction result because it is not required by following instructions. One skilled in the art will appreciate that decoding the compare macro instruction into a subtraction micro instruction is representative of the various techniques used within the art for accomplishing a compare operation. In addition, one skilled will understand that specification of the compare macro instruction results in the prescription of the temporary, non-architectural, register, T, for a result destination because the result of the comparison is not required by following macro instructions.

During cycle 2, the subtraction micro instruction proceeds through the register stage 103. Therein, the contents of registers A and B in the register file are retrieved and provided in operand registers (not shown) so that they can be piped down to the execute logic 107 in subsequent clock cycles. In addition during cycle 2, the conditional jump macro instruction proceeds through the translate stage 102. Therein, it is decoded into a corresponding conditional jump micro instruction, designated as Jc R. More specifically, the micro opcode field, Jc, prescribes a specific jump criteria and directs the microprocessor 100 to evaluate contents of the flags register 111 to determine if the criteria is satisfied. If the criteria is found to be true, a branch is to be made to a target location that is relatively offset from the current location by R bytes. One skilled in the art will acknowledge that most present day macro instruction sets only allow branch target addresses to be prescribed relative to a current address. For example, if the conditional jump macro instruction is located at location X in memory, then the branch target address is X+R. The offset, R, is prescribed within an immediate field of the conditional jump micro instruction that is piped down to the address stage for computation of the target address. If the prescribed criteria is determined to be false, then the conditional jump micro instruction directs the microprocessor 100 to continue sequential instruction execution.

It is during cycle 2 that the branch prediction logic 113 generates a predicted outcome and a predicted target address for the conditional jump instruction. This predicted target address is provided to the fetch stage 101 and the fetch stage 101 begins fetching macro instructions accordingly. The macro instruction located at the predicted target address is designated in the Translate column as PRED MAC.

During cycle 3, the subtraction micro instruction proceeds through the address stage 104. Therein, no operations are performed because calculation of memory addresses or branch addresses are not required; the micro opcode and two register operands are piped down to the next stage 105 of the microprocessor 100. Also during cycle 3, the conditional jump micro instruction proceeds though the register stage 103. Therein, no operation is performed because the conditional jump instruction prescribes only an immediate operand, R; no register operands are specified. The conditional jump macro instruction's micro opcode and immediate field, R, are transferred down to the next stage 104. In addition during cycle 3, the predicted branch instruction, PRED MAC, proceeds through the translate stage 102. Therein, it is decoded into corresponding micro instructions, the first of which is designated as PRED MIC.

During cycle 4, the subtraction micro instruction proceeds through the load stage 105. Also during cycle 4, the conditional jump micro instruction proceeds through the address stage 104. Therein, the immediate field, R, is provided to address generation logic (not shown) which generates a true target address for the branch should the branch be resolved taken. The true target address is provided in an address register (not shown) and is piped down to the next stage 105. In addition during cycle 4, PRED MIC proceeds through the register stage 103.

During cycle 5, the subtraction micro instruction proceeds through the align stage 106, therein forwarding the two register operands to the next stage 107. Also during cycle 5, the conditional jump micro instruction proceeds through the load stage 105, therein forwarding the true target address to the next stage 106. In addition during cycle 5, PRED MIC proceeds through the address stage 104.

During cycle 6, the subtraction micro instruction proceeds through the execute stage 107. Therein the ALU 112 subtracts the contents of register B from the contents of register A to generate a compare result, which is forwarded to the next stage 108. In addition, the execute logic 107 updates bits within the flags register 111 to describe particular attributes of the compare result. Also during cycle 6, the conditional jump micro instruction proceeds through the align stage 106, therein forwarding the true target address to the next stage 107. In addition during cycle 6, PRED MIC proceeds through the load stage 105.

During cycle 7, the subtraction micro instruction proceeds through the store stage 108, therein forwarding the compare result to the next stage 109. Also during cycle 7, the conditional jump micro instruction proceeds through the execute stage 107. Therein, the flags register 111 is evaluated to determine whether or not the compare result conforms to the conditions prescribed for a jump to occur. If so, then the branch is resolved as taken. If not, then the branch is resolved as not taken. In a present day microprocessor 100, whether or not the branch is taken is really not the issue at this point; what is resolved at this point is whether or not the true jump outcome is in accordance with the predicted outcome. If the predicted outcome of the jump is resolved to be correct, then the jump resolves correctly; the instruction stream corresponding to a correctly predicated outcome already follows. But if the true outcome of the branch is in opposition to the predicted outcome, then it is at this point that the execute logic 107 directs the flush logic 110 to flush the pipeline and refill it with instructions corresponding to the true outcome of the branch. For illustrative purpose, the table 200 assumes a correctly predicted outcome. Accordingly, during cycle 7, PRED MIC is allowed to proceed through the align stage 106.

During cycle 8, the subtraction micro instruction proceeds through the write back stage 109. Therein, the compare result is written to temporary register T. At this point, execution of the subtraction micro instruction is complete. Also during cycle 8, the conditional jump micro instruction proceeds through the store stage 108. In addition during cycle 8, PRED MIC proceeds through the execute stage 107.

During cycle 9, the conditional jump micro instruction proceeds through the write back stage 109, therein completing execution. At this point, execution of the compare-and-jump operation is complete. In addition during cycle 8, PRED MIC proceeds through the store stage 108.

Several points are presented for consideration regarding execution of the compare-and-jump operation discussed above with reference to FIG. 2. First, it is noted that the two micro instructions directing execution of the compare-and-jump operation result from the translation of two corresponding macro instructions. Hence, the compare-and-jump operation requires at least two cycles of the microprocessor clock: one cycle for execution of the subtraction micro instruction and a second cycle for execution of the conditional jump micro instruction. Because of time constraints in the fetch and translate stages 101, 102 of the pipeline, the tendency of a present day microprocessor 100 having only a single integer pipeline is toward one-to-one or one-to-many translation of macro instructions into micro instructions. What this means is that a present day single integer pipeline microprocessor 100 typically makes no attempt to combine two or more macro instructions into a single micro instruction. Microprocessors do exist, such as Intel's Pentium® III, that have parallel integer execution pipelines capable of executing macro instructions in parallel, but these microprocessors are much more complex and costly than a single integer pipeline machine 100 like that shown in FIG. 1. Within a present day single pipeline architecture, combination of the compare operation with the jump operation is not feasible because both operations require dedicated execute stage resources. Logic in the execute stage 107 must first make the comparison and update the flags register 111. Following this, the execute logic 107 must evaluate the flags register 111 in order to resolve the conditional jump. To combine the tasks into a single micro instruction would not result in a net cycle savings because the execute logic 107 must sequentially perform the two tasks.

Second, the present inventors have observed that most macro instruction sets, and specifically the x86 instruction set, only allow immediate field prescription of branch target within a conditional jump instruction. Other addressing means for these instructions are not permitted. Third, the present inventors have noticed that a remarkable percentage of compare-and-jump operations within present day application programs employ register/register compares as opposed to other addressing schemes. And since micro instruction sets that are capable of executing x86 macro instructions must make provision for micro instructions to prescribe register/register operands, register/immediate operands, and register/memory operands, it follows then that a register/register subtraction micro instruction corresponding to a register/register compare macro instruction traverses the pipeline with an empty immediate field. In addition, a conditional jump micro instruction traverses the pipeline with two empty register operand fields.

Therefore, to improve the execution speed of compare-and-branch operations within a single integer pipeline microprocessor, the present invention is provided. The present invention allows single-cycle execution of a compare-and-branch operation by providing 1) logic for combining a register/register compare macro instruction and a following conditional jump macro instruction into a single compare-and-jump micro instruction, and 2) logic for executing the single compare-and-jump micro instruction. The present invention is now described with reference to FIGS. 3 through 6.

Figure 3:
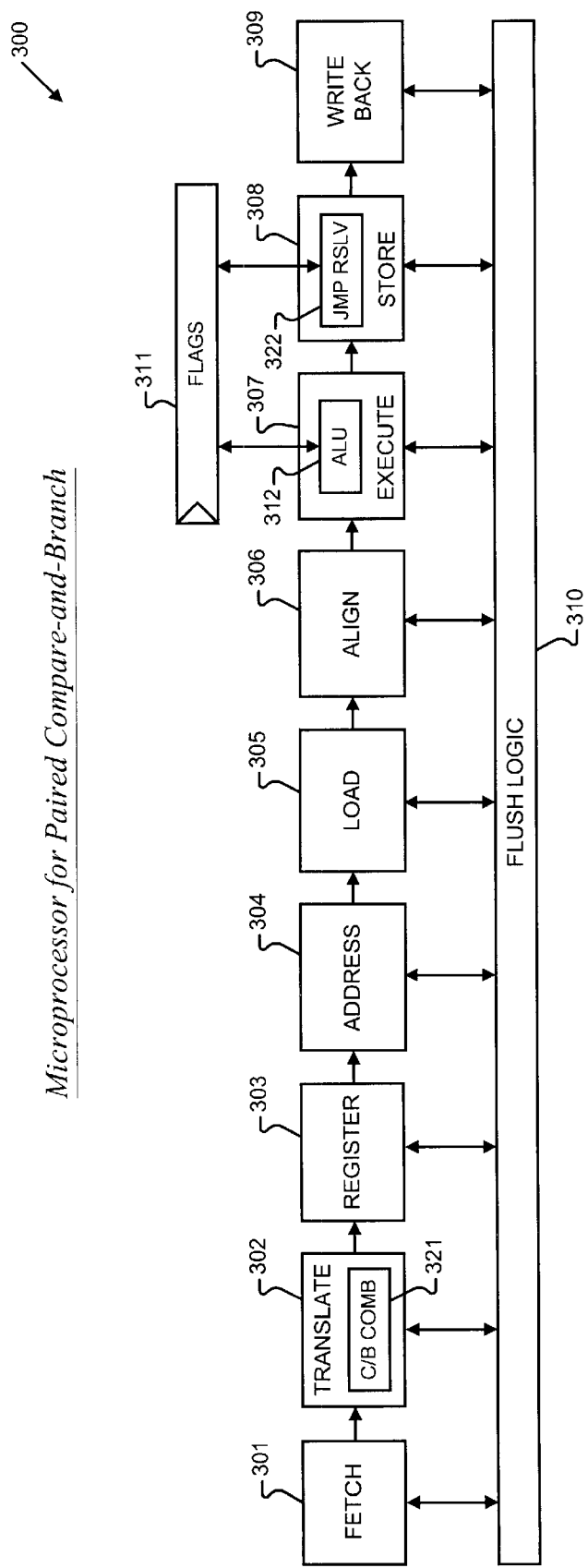
FIG. 3 is a block diagram illustrating pipeline stages of a microprocessor according to the present invention.

Referring to FIG. 3, a block diagram is presented illustrating pipeline stages of a microprocessor 300 according to the present invention. The microprocessor 300 includes a fetch stage 301, translate stage 302, register stage 303, address stage 304, load stage 305, align stage 306, execute stage 307, store stage 308, and write back stage 309. Compare/branch combination logic 321 is included in the translate stage 302 and the execute stage 307 includes an arithmetic logic unit (ALU) 312. The ALU 312 accesses a flags register 311. The microprocessor 300 also has pipeline flush logic 110 coupled to each of the pipeline stages 101–109. And in contrast to a present day microprocessor 100, the store stage 308 includes a jump resolver 308 that is capable of accessing the flags register 311. The jump resolution logic 308, or condition evaluation logic 308, is employed to resolve conditional branches corresponding to combined compare-and-jump operations.

In operation, elements of the microprocessor 300 according to the present invention function very similar to like numbered elements of the microprocessor 100 of FIG. 1, the hundreds digit being replaced with a 3. However, two features that distinguish the microprocessor 300 according to the present invention from other present day single integer pipeline microprocessors 100 are illustrated in the block diagram. First, the translate stage 302 has a jump combiner 321 to detect and combine macro instructions directing a compare-and-branch operation. These macro instructions are combined into a single compare/branch micro instruction. The compare task associated with the compare/branch micro instruction is performed within the execute stage 307 where the flags register 311 is updated to reflect attributes of the compare result. And what allows single-cycle execution of the combined compare/branch operation is that the evaluation of the flags register 311 to resolve the jump operation is performed by the jump resolver 322 in the following store stage 308. If the jump resolution logic 322 resolves the conditional jump in opposition to what has been predicted, then the flush logic 310 flushes the pipeline and refills it with instructions corresponding to the true branch outcome. A discussion of detailed logic within each of the stages of the microprocessor 300 according to the present invention is now provided with reference to FIG. 4.

Figure 4:
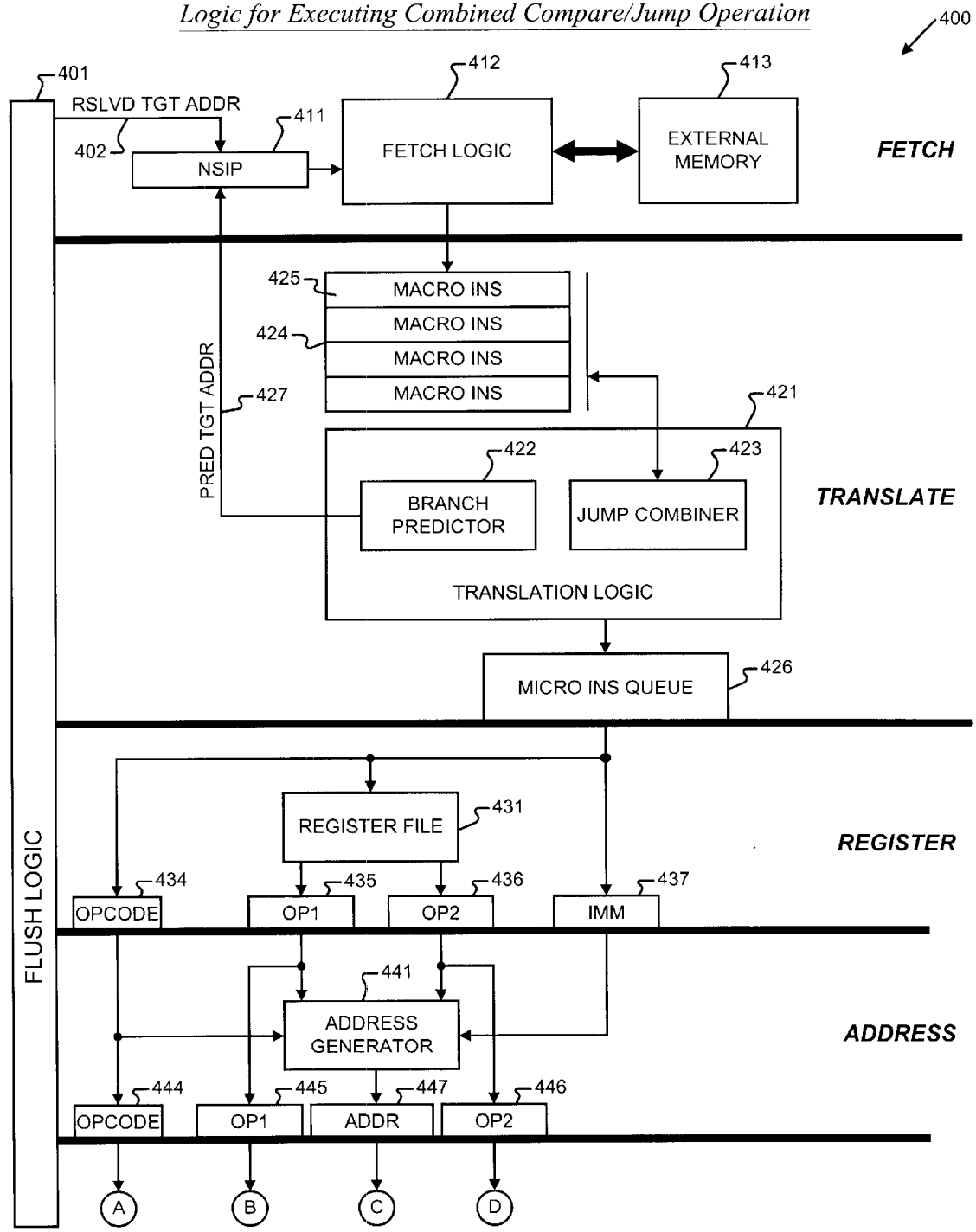
FIG. 4 is a block diagram of the microprocessor according to the present invention featuring apparatus for generating and executing a single compare/jump micro instruction.

Referring to FIG. 4, a block diagram is presented of the microprocessor 400 according to the present invention featuring apparatus for generating and executing a single compare/jump micro instruction. As was briefly discussed with reference to FIG. 3, the microprocessor 400 has a fetch stage, translate stage, register stage, address stage, load stage, align stage, execute stage, store stage, and write back stage. The fetch stage has fetch logic 412 that accesses macro instruction addresses from a next sequential instruction pointer 411. The fetch logic 412 retrieves the macro instructions from external memory 413 and provides them to the translate stage in a macro instruction buffer 424. The macro instruction buffer 424 can queue a plurality of macro instructions for translation. In one embodiment, the macro instruction buffer 424 has four macro instruction entries 425.

The translate stage has translation logic 421. The translation logic includes a branch predictor 422 and a jump combiner 423. The jump combiner 423 accesses multiple entries 425 in the macro instruction buffer 424 for the purpose of pairing macro instructions for combined execution. In addition, the branch prediction logic 422 provides a predicted target address, PRED TGT ADDR, via bus 427 to the next sequential instruction pointer 411. The translation logic 421 outputs micro instructions for execution into a micro instruction queue 426.

The register stage has a dual-ported register file 431 that receives micro instructions from the micro instruction queue 426 and provides up to two register operand outputs into a first operand register 435, OP1 and a second operand register 436, OP2. In addition, the micro opcode field of a micro instruction is provided to the next stage via buffer 434. The micro instruction's immediate field is provided via buffer 437.

The address stage had an address generator 441 that receives inputs from buffers 434–437 and generates address outputs into an address register 447. In addition, the address stage has an opcode buffer 444, a first operand buffer 445, and a second operand buffer 446 for forwarding micro opcodes and operands to the next stage.

The load stage features load logic 451 that receives an address input from the address register 447. The load logic reads lines of memory that include the provided address and output these lines of memory into a line buffer 458. In addition, the load stage includes buffers 454–457 for forwarding the micro opcode, register operands, and computed address to the next stage.

The align stage has alignment logic 461 that receives memory lines from the line buffer 458. Operands that are extracted from the memory lines are output to operand register 468. In addition, the align stage includes buffers 464–467 for forwarding the micro opcode, register operands, and computed address to the next stage.

The execute stage has an arithmetic logic unit (ALU) 471 that provides result outputs to a result register 479. The ALU 471 also updates a flags register 472 to reflect the state of generated results. For stand-alone conditional jump micro instructions, the ALU 471 also accesses the flags register 472 to evaluate prescribed jump criteria corresponding to a previously generated result. A clear bus 473, CLEAR, is provided to flush logic 401 to indicate that a resolved branch is in opposition to what has been predicted. In addition, the execute stage includes buffers 474–478 for forwarding the micro opcode, register operands, memory operand, and computed address to the next stage.

The store stage has store logic 481 that writes memory with the contents of the result register 479, the contents of register operand buffer 476, or the contents of register operand buffer 475. Memory is written at the address provided in the address register 477. In addition, the store stage includes condition evaluation logic 482 that accesses the flags register via bus 485. The condition evaluation logic 482, or branch resolution logic 482, indicates that a resolved branch corresponding to a combined compare/branch micro instruction is in opposition to its predicted outcome via bus 483, CLEAR. In addition, buffers 484, 488, and 486 forward the opcode, the generated result, and the memory operand to the next stage.

The write back stage includes write back logic 491 that writes either the contents of result register 489 or the retrieved memory operand from register 488 into the register file 431.

In operation, macro instructions are fetched by the fetch logic 412 from memory 413 in the sequence indicated by the next sequential instruction pointer 411. The fetched macro instructions are queued in entries 425 in the macro instruction queue 424 for decoding by translation logic 421. The translation logic decodes fetched macro instructions in order into corresponding micro instructions. The corresponding micro instructions are provided for execution in the micro instruction queue 426. When a branch instruction is read from the macro instruction buffer 424, the branch prediction logic 422 generates a predicted branch outcome and provides a predicted target address via bus 427 to the next sequential instruction pointer 411 so that the flow of instructions through the pipeline is not interrupted. In addition, when a compare macro instruction is detected within the instruction buffer 424, the jump combiner 423 evaluates the compare macro instruction to determine if it is a register/register compare macro instruction and if the following instruction in the buffer 424 is a conditional jump macro instruction. When a register/register compare macro instruction is detected in conjunction with an immediately following conditional jump macro instruction, the jump combiner 423 pairs the two macro instructions for execution by decoding these into a single compare/branch micro instruction, which is then issued to the micro instruction queue 426 for execution. The micro opcode field of the compare/branch micro instruction directs the microprocessor 400 to perform both the comparison and the conditional jump operation. In addition the micro opcode prescribes the specific condition upon which the branch decision is to be made.

As the combined compare/jump micro instruction is piped through the register stage, the two operands for the comparison are retrieved from the register file 431 and are provided to buffers 435 and 436. The immediate field of the compare/branch micro instruction that prescribes the relative address offset for the jump is provided in immediate buffer 437.

Within the address stage, the true target address for the conditional jump is generated by the address generator 441 using the relative offset provided in the immediate register 437. The true target address is output to address buffer 447.

For a paired compare/jump micro instruction, no operations of interest occur in the load stage or align stage other than that the micro opcode, the two register operands, and the target address are forwarded via buffers 454–457 and buffers 464–467.

When the compare/branch micro instruction enters the execute stage, the ALU 471 performs the comparison of the two register operands retrieved from buffers 465–466 to generate a comparison result. The ALU 471 then records the attributes of the comparison result by setting appropriate bits in the flags register 472.

Condition evaluation logic 482 in the store stage evaluates the state of the flags register 471 via bus 485 for combined compare/jump micro instructions to resolve the jump task that is directed by the instructions. If the jump is resolved in agreement with the outcome predicted by the branch prediction logic 422, then the condition evaluator 482 allows instruction execution to proceed; instructions corresponding to the correct branch outcome are already in the pipeline. However, if the jump resolver 482 determines that the resolved branch outcome is in opposition to the prediction, then the true target address for the jump is retrieved from address buffer 477 and is provided to the flush logic 401 via bus 483, CLEAR. For incorrectly predicted jumps, the flush logic 401 flushes the pipeline and provides the resolved target address to the next sequential instruction pointer 411 via bus 402.

The write back logic 491 writes the comparison result to its destination register, however, in one embodiment, the destination register need not be resident within the register file 431 since it is a temporary register. In an alternative embodiment, the comparison result is not written at all because it is not required by following instructions.

Now referring to FIG. 5, a table 500 is presented illustrating paired execution of a compare macro instruction and a conditional jump macro instruction by the microprocessor 400 of FIG. 4. The compare-and-jump operation is prescribed by the first two macro instructions shown in the Translate column of the table 500: a compare macro instruction, designated as CMP A,B, and a conditional jump macro instruction, designated as Jc R. The compare macro instruction directs the microprocessor 100 to compare the contents of registers A and B in the register file 431 and to update the flags register 472 based upon the result of the comparison. The conditional jump macro instruction directs the microprocessor 400 to read the flags register 472 and, if a prescribed condition is found to be true following the comparison, to branch to a target address prescribed by an immediate operand, R. The prescribed condition could be any combination of bit states within the flags register 472 like that described earlier with reference to an x86 conditional jump instruction. Also, for clarity purposes, a column corresponding to the fetch stage of the microprocessor 400 is not shown. Execution of the instructions by the microprocessor 400 is described with reference to cycles of a pipeline clock. Non-relevant instructions before and after instructions of interest are designated by "* * *".

During cycle 1, both the compare macro instruction and the conditional jump macro instruction proceed through the translate stage. Both macro instructions are retrieved from the macro instruction buffer 424 by the translation logic 421 and are provided to the jump combiner 423. The jump combiner 423 determines that the compare macro instruction prescribes register operands only and that the conditional branch macro instruction immediately follows the compare macro instruction in the execution order. Hence, the two instructions are paired for execution, resulting in the generation of a single compare-and-branch micro instruction, designated as SUB.Jc T,A,B,R. More specifically, a micro opcode field, SUB.Jc, prescribes a subtraction operation to effect the compare task along with a prescribed condition upon which to make a jump decision. The two registers in the register file 431 containing the operands to be compared are specified in source register fields designated as A and B. A temporary destination register, T, is designated for the comparison result. An immediate field of the compare/jump micro instruction prescribes a relative offset for the jump, R. In addition, during cycle 1, the branch predictor 422 provides a predicted target address for the jump to the next sequential instruction pointer 411 via bus 427. At this point, the fetch logic 412 begins fetching instructions at the predicted target address to follow the conditional jump macro instruction.

During cycle 2, the compare/branch micro instruction proceeds through the register stage, therein retrieving the contents of registers A and B from the register file 431. The two register operands are provided in buffers 435 and 436, the jump offset, R, is provided in buffer 437, and the micro opcode is provided in 434. Also during cycle 2, the macro instruction corresponding to the predicted outcome, PRED MAC, proceeds through the translate stage. Therein, it is decoded into corresponding micro instructions, the first of which is designated as PRED MIC.

During cycle 3, the compare/branch micro instruction proceeds through the address stage. Therein, the address generator 441 retrieves the jump offset from buffer 437 and generates a true jump target address. The jump target address is output to the address register 447. In addition, the opcode and two register operands are forwarded via buffers 444–446. Also during cycle 3, PRED MIC proceeds though the register stage.

During cycles 4 and 5, the compare/branch micro instruction and PRED MIC proceed through their corresponding next two pipeline stages without relevant activity.

During cycle 6, the compare/branch micro instruction proceeds through the execute stage. Therein, the ALU 471 performs a subtraction operation to compare the two register operands retrieved from buffers 465 and 466 to generate a comparison result. The comparison result is placed in the result register 486. In addition, the ALU 471 updates the flags register 472 to reflect the attributes of the comparison result. In addition during cycle 6, PRED MIC proceeds through the align stage.

During cycle 7, the compare/branch micro instruction proceeds through the store stage. Therein, the jump resolver 482 evaluates one or more bits within the flags register 472 via bus 485 to determine whether or not the criteria prescribed for the conditional branch has been satisfied, thus resolving the conditional branch. If the jump is resolved in agreement with the outcome predicted by the branch predictor 422, then the store logic 481 allows the instructions to proceed. If the jump is resolved in opposition to the outcome predicted by the branch predictor 422, then the condition evaluator 482 retrieves the true target address from register 477 and provides it to the flush logic 401 via CLEAR 483, thus initiating a pipeline flush and refill. For illustrative purpose, the table 500 assumes a correctly predicted outcome. Accordingly, during cycle 7, PRED MIC is allowed to proceed through the execute stage.

During cycle 8, the compare/branch micro instruction proceeds through the write back stage. Therein, the comparison result is written to temporary register T. At this point, execution of the combined compare-and-jump micro instruction is complete.

In contrast to conventional execution of compare-and-jump operations, the single integer pipeline microprocessor 400 according to the present invention only requires one cycle of the pipeline clock perform the operation. This enables a compare-and-jump operation to be performed in half the number of clock cycles over what has heretofore been provided for single integer pipelines, thus substantially increasing throughput.

Now referring to FIG. 6, a flow chart 600 is provided illustrating a method according to the present invention for generating a single micro instruction to perform a compare-and-jump operation within a single integer pipeline microprocessor.

Flow begins at block 602, where fetch logic within a microprocessor according to the present invention retrieves a number of macro instructions from memory and provides them for translation within a macro instruction queue. Flow then proceeds to block 604.

At block 604, translation logic according to the present invention scans the macro instruction queue to determine which specific macro instructions have been scheduled for translation. Flow then proceeds to decision block 606.

At decision block 606, the specific macro instructions within the translator input queue are evaluated to determine if a compare macro instruction has been scheduled for execution. If so, then flow proceeds to decision block 608. If not, then flow proceeds to block 618.

At decision block 608, the compare macro instruction is evaluated to determine if it specifies register operands only. If so, then flow proceeds to block 610. If an immediate operand or a memory operand is prescribed by the compare macro instruction, then it is not a candidate for pairing; flow proceeds to block 618.

At block 610, since the compare macro instruction is a candidate for pairing, jump combination logic according to the present invention scans the macro instruction that follows the compare macro instruction in the execution order. Flow then proceeds to decision block 612.

At decision block 612, the following macro instruction is evaluated to determine if it is a conditional branch macro instruction that prescribes a branch target address in terms of an immediate offset operand. If so, then flow proceeds to block 614. If not, then flow proceeds to block 618.

At block 614, the jump combination logic determines the conditions prescribed by the conditional jump macro instruction upon which a jump decision will be made following the compare operation. Flow then proceeds to block 616.

At block 616, the jump combination logic generates a single compare-and-jump micro instruction and issues it for execution by the single integer pipeline. The compare-and-jump micro instruction's opcode directs the microprocessor to perform both the compare operation and the jump operation. In addition, the prescribed condition upon which the jump is to be based is encoded in the micro opcode. Furthermore, two source operand fields within the micro instruction prescribe two registers within a register file that contain the two operands which are to be compared. And an immediate field of the micro instruction prescribes a relative offset used to compute the jump target address. Flow then proceeds to block 618.

At block 618, the method completes.

Although the present invention and its objects, features, and advantages have been described in detail, other embodiments are encompassed by the invention. For example, the present invention has been described with respect to pairing of a conditional jump macro instruction with a compare macro instruction, where the compare macro instruction is described as being a macro instruction that directs the microprocessor compare two register operands and to generate a comparison result. A flags register is accordingly updated to properly reflect the attributes of the result. Thereafter, a branch decision is made based upon criteria that is specified in terms of bit states within the flag register. But compare instructions are not the only macro instructions that generate results that cause the flags register to be updated. Indeed, all arithmetic macro instructions to include ADD, SUB, MUL, and DIV, generate results that cause an update of the flags register. And although compare-and-jump operations are very common within present day application programs, arithmetic/jump combinations have been observed as well. It is noted that the present invention comprehends all such macro instruction pairs where the preceding macro instruction prescribes register operands only.

Those skilled in the art should appreciate that they can readily use the disclosed conception and specific embodiments as a basis for designing or modifying other structures for carrying out the same purposes of the present invention without departing from the spirit and scope of the invention as defined by the appended claims.

What is claimed is:

1. A microprocessor, having a single integer pipeline, for performing a compare-and-branch operation, the microprocessor comprising:

translation logic, configured to receive a compare macro instruction and a conditional jump macro instruction, and configured to generate a compare-and-branch micro instruction directing the microprocessor to make a comparison and to perform a conditional branch based upon a result of said comparison; and execute logic, coupled to said translation logic, configured to make said comparison and to generate said result.

2. The microprocessor as recited in claim 1, wherein said compare macro instruction prescribes a first register operand and a second register operand.

3. The microprocessor as recited in claim 2, wherein said conditional jump macro instruction prescribes a condition and a target address, wherein program flow is to be transferred to said target address if said condition is met.

4. The microprocessor as recited in claim 3, wherein said condition is one of a plurality of jump conditions, said plurality of jump conditions comprising: above, not above, above or equal, not above or equal, below, not below, below or equal, not below or equal, carry, not carry, equal, not equal, greater, not greater, greater or equal, not greater or equal, less, not less, less or equal, not less or equal, overflow, not overflow, sign, not sign, zero, not zero, parity even, and parity odd.

5. The microprocessor as recited in claim 4, wherein said plurality of jump conditions corresponding to said result are indicated by flag bits within a flags register.

6. The microprocessor as recited in claim 5, wherein said conditional jump macro instruction immediately follows said compare macro instruction in execution order.

7. The microprocessor as recited in claim 6, wherein said translation logic comprises:

compare/branch combination logic, configured to produce said compare-and-branch micro instruction, said compare-and-branch micro instruction comprising:

a first source operand field, configured to prescribe a first register that contains said first register operand;

a second source operand field, configured to prescribe a second register that contains said second register operand;

an immediate field, configured to prescribe said target address; and an opcode field, configured to prescribe said condition, and configured to direct said execute logic to make said comparison.

8. The microprocessor as recited in claim 6, wherein said execute logic makes said comparison by subtracting said second register operand from said first register operand to generate said result, and wherein said execute logic sets said flag bits in said flags register to indicate said result.

9. The microprocessor as recited in claim 6, further comprising:

condition evaluation logic, coupled to said execution logic, configured to evaluate said result and to resolve said conditional branch according to said result.

10. The microprocessor as recited in claim 9, wherein said condition evaluation logic reads said flags register and evaluates one or more of said flag bits to determine if said condition has been met.

11. The microprocessor as recited in claim 10, wherein, if said condition has been met, said condition evaluation logic resolves said conditional branch as taken.

12. The microprocessor as recited in claim 10, wherein, if said condition has not been met, said condition evaluation logic resolves said conditional branch as not taken.

13. An apparatus in a single pipeline microprocessor for executing a compare-and-branch operation, the apparatus comprising:

a jump combiner, for pairing a compare instruction and a conditional jump instruction into a compare/branch micro instruction, said compare/branch micro instruction prescribing a comparison task and a conditional branch task;

compare execution logic, coupled to said jump combiner, for receiving said compare/branch micro instruction, for performing said comparison task, for generating a result of said comparison task, and for updating bits in a flags register to describe said result; and jump resolution logic, coupled to said compare execution logic, for evaluating one or more of said bits to resolve said conditional branch task.

14. The apparatus as recited in claim 13, wherein said compare instruction specifies a first register and a second register, said registers being within a register file.

15. The apparatus as recited in claim 14, wherein said conditional jump instruction specifies a jump condition and a branch address, wherein program instruction flow is to be transferred to said branch address if said jump condition is true.

16. The apparatus as recited in claim 15, wherein a plurality of conditions describing said result are represented by said bits within said flags register.

17. The apparatus as recited in claim 15, wherein said conditional jump instruction executes immediately following said compare instruction within the single pipeline microprocessor.

18. The apparatus as recited in claim 17, wherein said compare/branch micro instruction comprises:

a first source operand field, prescribing said first register that contains a first operand;

a second source operand field, prescribing said second register that contains a second operand;

an immediate field, prescribing said branch address; and a micro opcode field, prescribing said jump condition, and directing said compare execution logic to compare said operands to generate said result.

19. The apparatus as recited in claim 15, wherein said jump resolution logic resolves said conditional branch operation as taken if said one or more of said bits indicate that said jump condition is true.

20. The apparatus as recited in claim 15, wherein said jump resolution logic resolves said conditional branch operation as not taken if said one or more of said bits indicate that said jump condition is not true.

21. An apparatus for executing a macro instruction sequence that directs a microprocessor to compare two register operands, to update a flags register to describe a comparison result, to evaluate the flags register to determine if the comparison result satisfies a prescribed condition, and to transfer program control to a branch target address if the prescribed condition is satisfied, the apparatus comprising:

translation logic, configured to decode the macro instruction sequence into a compare-and-branch micro instruction, said compare-and-branch micro instruction comprising:

two operand fields, specifying the two register operands;

an opcode field, specifying the prescribed condition, and directing execute logic to compare the two register operands to generate the comparison result; and an immediate field, specifying the branch target address; and condition evaluation logic, coupled to said translation logic, for evaluating the flags register.

22. The apparatus as recited in claim 21, wherein the prescribed condition comprises one or more of a plurality of conditions describing the comparison result, said plurality of conditions being represented by bits within the flags register.

23. The apparatus as recited in claim 22, wherein the macro instruction sequence comprises a compare macro instruction immediately followed by a conditional jump macro instruction.

24. The apparatus as recited in claim 22, wherein said condition evaluation logic directs the microprocessor to transfer program control to the branch target address corresponding ones of said bits indicate that the prescribed condition is satisfied.

25. A method for performing a compare-and-branch operation in a pipeline microprocessor, comprising:

translating a compare macro instruction and a conditional jump macro instruction into a single compare-and-jump micro instruction;

performing a compare operation prescribed by the single compare-and-jump micro instruction to produce a result; and evaluating the result in accordance with a condition prescribed by the single compare-and-jump micro instruction to indicate whether or not a branch is to be taken.

26. The method as recited in claim 25, wherein said translating comprises:

monitoring fetched macro instructions to detect the compare macro instruction and the conditional jump micro instruction;

determining that operands prescribed by the compare macro instruction are register operands; and confirming that the conditional jump macro instruction immediately follows the compare macro instruction.

27. The method as recited in claim 26, wherein said translating further comprises:

decoding the conditional jump macro instruction to determine the condition; and prescribing the condition within the compare-and-jump micro instruction.

28. The method as recited in claim 25, wherein said performing comprises:

taking the difference between two operands to produce the result; and setting bits in a flags register that describe the result.

29. The method as recited in claim 25, wherein said evaluating comprises:

treading selected bits of a flags register corresponding to the condition; and according to the state of the selected bits, indicating whether or not the condition has been met.

* * * * *